United States Patent
Sen et al.

(10) Patent No.: US 10,309,218 B2
(45) Date of Patent: Jun. 4, 2019

(54) DIELECTRIC CONTRAST AGENTS AND METHODS

(71) Applicants: The University of North Carolina at Chapel Hill, Chapel Hill, NC (US); Board of Regents, The University of Texas System, Austin, TX (US)

(72) Inventors: Pabitra Sen, Chapel Hill, NC (US); Alfred Kleinhammes, Chapel Hill, NC (US); Yue Wu, Chapel Hill, NC (US); Mohsen Ahmadian-Tehrani, Austin, TX (US)

(73) Assignees: THE UNIVERSITY OF NORTH CAROLINA AT CHAPEL HILL, Chapel Hill, NC (US); BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 0 days.

(21) Appl. No.: 14/551,865

(22) Filed: Nov. 24, 2014

(65) Prior Publication Data
US 2015/0167459 A1    Jun. 18, 2015

Related U.S. Application Data

(63) Continuation of application No. PCT/US2013/043603, filed on May 31, 2013.
(Continued)

(51) Int. Cl.
*G01V 3/30* (2006.01)
*E21B 49/08* (2006.01)
(Continued)

(52) U.S. Cl.
CPC ........ *E21B 49/087* (2013.01); *E21B 47/0002* (2013.01); *E21B 47/102* (2013.01); *E21B 47/122* (2013.01); *G01V 3/30* (2013.01)

(58) Field of Classification Search
CPC .. E21B 49/087; E21B 47/0002; E21B 47/102; E21B 47/122
See application file for complete search history.

(56) References Cited

U.S. PATENT DOCUMENTS

| 3,657,730 A | 4/1972 | Robinson et al. | |
|---|---|---|---|
| 4,491,796 A * | 1/1985 | Smith | E21B 47/02 324/346 |

(Continued)

FOREIGN PATENT DOCUMENTS

EP    0159270 A2 * 10/1985    ............... G01V 3/28

OTHER PUBLICATIONS

International Search Report for Application No. PCT/US 2013/043603 dated Aug. 30, 2013.

*Primary Examiner* — Zakiya W Bates
*Assistant Examiner* — Crystal J Miller
(74) *Attorney, Agent, or Firm* — Matheson Keys & Kordzik PLLC; Kelly Kordzik

(57) ABSTRACT

Contrast agents and methods for use in geological applications are provided. Contrast agents can be a nanopolymorph material, such as titania nanotubes, and have a low-frequency dielectric permittivity. Methods of identifying one or more subterranean features during geological exploration are provided. Methods of identifying a ganglion of bypassed oil are provided. Methods of illuminating subterranean fractures in hydraulic fracturing are provided.

20 Claims, 5 Drawing Sheets

Related U.S. Application Data

(60) Provisional application No. 61/689,179, filed on May 31, 2012.

(51) Int. Cl.
  *E21B 47/00* (2012.01)
  *E21B 47/10* (2012.01)
  *E21B 47/12* (2012.01)

(56) References Cited

U.S. PATENT DOCUMENTS

| | | | | |
|---|---|---|---|---|
| 4,755,944 | A * | 7/1988 | Glass | G01V 3/30 324/339 |
| 5,065,100 | A * | 11/1991 | Vail, III | G01V 3/28 324/339 |
| 5,151,658 | A * | 9/1992 | Muramatsu | G01V 3/26 166/254.2 |
| 6,294,917 | B1 * | 9/2001 | Nichols | G01V 3/28 324/339 |
| 7,565,244 | B2 * | 7/2009 | Alumbaugh | G01V 3/30 324/323 |
| 8,016,038 | B2 * | 9/2011 | Goodwin | E21B 47/10 166/264 |
| 8,168,570 | B2 * | 5/2012 | Barron | B01J 13/02 428/357 |
| 8,269,501 | B2 * | 9/2012 | Schmidt | G01V 3/26 166/254.2 |
| 8,269,648 | B2 * | 9/2012 | Benischek | E21B 47/121 340/853.1 |
| 8,557,290 | B2 * | 10/2013 | Wu | A61K 41/0057 252/62.59 |
| 8,638,104 | B2 * | 1/2014 | Barber | G01V 3/00 324/338 |
| 8,664,586 | B2 * | 3/2014 | Schmidt | G01V 5/08 250/265 |
| 8,803,077 | B2 * | 8/2014 | Schmidt | G01V 5/08 250/265 |
| 8,884,623 | B2 * | 11/2014 | Anderson | G01V 3/30 324/332 |
| 8,937,279 | B2 * | 1/2015 | Schmidt | G01V 3/12 250/265 |
| 9,133,709 | B2 * | 9/2015 | Huh | E21B 47/1015 |
| 2005/0074611 | A1 * | 4/2005 | Kuehnle | B82Y 30/00 428/403 |
| 2006/0102345 | A1 * | 5/2006 | McCarthy | C09K 8/805 166/250.1 |
| 2008/0124281 | A1 * | 5/2008 | Gao | A61K 49/1884 424/9.32 |
| 2008/0230223 | A1 * | 9/2008 | McCrary | C09D 5/03 166/272.2 |
| 2009/0179649 | A1 * | 7/2009 | Schmidt | G01V 3/26 324/345 |
| 2009/0200016 | A1 * | 8/2009 | Goodwin | E21B 47/10 166/248 |
| 2009/0263331 | A1 * | 10/2009 | Wu | A61K 41/0057 424/9.323 |
| 2009/0288820 | A1 * | 11/2009 | Barron | B01J 13/02 166/249 |
| 2009/0294692 | A1 * | 12/2009 | Bourke, Jr. | A23L 3/26 250/459.1 |
| 2010/0102986 | A1 * | 4/2010 | Benischek | E21B 47/122 340/855.8 |
| 2010/0286918 | A1 | 11/2010 | Moos et al. | |
| 2011/0166046 | A1 * | 7/2011 | Weaver | C02F 1/325 507/101 |
| 2011/0309835 | A1 * | 12/2011 | Barber | G01V 3/00 324/339 |
| 2012/0153958 | A1 * | 6/2012 | Anderson | G01V 3/30 324/332 |
| 2012/0181020 | A1 * | 7/2012 | Barron | B01J 13/02 166/250.1 |
| 2012/0306501 | A1 * | 12/2012 | Schmidt | G01V 3/26 324/345 |
| 2013/0000899 | A1 * | 1/2013 | Broussard | E21B 33/124 166/278 |
| 2013/0091941 | A1 * | 4/2013 | Huh | E21B 47/1015 73/152.08 |
| 2013/0146756 | A1 * | 6/2013 | Schmidt | G01V 5/08 250/264 |
| 2013/0213638 | A1 * | 8/2013 | Keller | C04B 28/02 166/248 |
| 2014/0035589 | A1 * | 2/2014 | Dell'Aversana | G01V 3/30 324/338 |
| 2014/0239957 | A1 * | 8/2014 | Zhang | G01V 3/30 324/334 |
| 2014/0347055 | A1 * | 11/2014 | Schmidt | G01V 3/12 324/338 |
| 2016/0312574 | A1 * | 10/2016 | Moffitt | E21B 43/10 |

* cited by examiner

DIELECTRIC CONTRAST AGENTS AND METHODS

CROSS REFERENCE TO RELATED APPLICATIONS

This application is a continuation of and claims priority to PCT/US2013/043603 filed May 31, 2013, which claims the benefit of and priority to U.S. Provisional Application No. 61/689,179, filed May 31, 2012, the entire disclosures of which are incorporated by reference herein in their entireties.

TECHNICAL FIELD

This presently disclosed subject matter relates generally to dielectric contrast agents or compositions and related methods and uses thereof. More specifically, the presently disclosed subject matter is directed to contrast agents or compositions and methods of use, for example and without limitation, in geological exploration, mining and the recovery of natural resources.

BACKGROUND

Geological exploration, mining and the recovery of natural resources require an ability to locate and define as best as possible reservoirs of natural resources, such as oil and natural gas. Currently available methods for identifying and estimating the quantity of oil and natural gas in a given location have limitations. Further, traditional methods of extracting oil and natural gas can be inefficient, thereby causing significant portions of oil and natural gas to remain unrecovered.

SUMMARY

It is an object of the subject matter disclosed herein to provide novel contrast agents and methods of use in geological exploration, mining and recovery.

An object of the presently disclosed subject matter having been stated hereinabove, and which is achieved in whole or in part by the subject matter disclosed herein and/or in the accompanying materials, this and other objects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which:

FIG. 5A is a transmission electron microscopy (TEM) image of as-synthesized TiNTs. FIG. 5B is a scanning electron microscopy (SEM) image of TiNTs;

DETAILED DESCRIPTION

Figure 1:
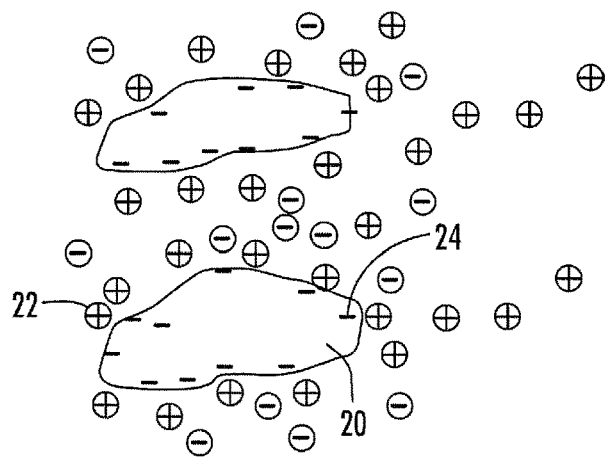
FIG. 1 is a diagram illustrating clay or titanium oxide ($TiO_2$) double-layer polarization at the particle level.

Compositions and methods are disclosed for use in geological exploration, mining and recovery of natural resources. The compositions and methods disclosed herein can provide for the identification of subterranean features during geological exploration. The compositions and methods can, for example and without limitation, be used for the exploration, mining and recovery of oil and natural gas. The compositions and methods can be used to locate and define reservoirs of oil and natural gas and estimate the quantity of oil and natural gas capable of being recovered. The disclosed compositions and methods can be used to monitor recovery and safety during the extraction of oil and natural gas.

Traditional methods of oil recovery can be inefficient. For example, after the primary recovery of oil from a reservoir, about 30-70% residual oil in place (ROIP) remains in the reservoir in the form of ganglions, which are oil blobs that are generally a few pore-lengths long (in the direction of the flow) and about a pore wide. In some embodiments, the disclosed compositions and methods can be used to locate and estimate ROIP in reservoirs, which can then be recovered to increase the efficiency of oil recovery.

Contrast agents or compositions are disclosed herein that can be used in geological exploration, mining and recovery. The contrast agents can be used to locate and define reservoirs of oil and natural gas and estimate the quantity of oil and natural gas capable of being recovered. The contrast agents can allow for the monitoring of the recovery of oil and natural gas, both to improve efficiency and ensure safety. The contrast agents can allow for the identification and definition of subterranean features.

Contrast agents and methods can selectively enhance the dielectric effects of ganglions of oil, for example, by decorating or otherwise suitably exposing the oil-water interfaces with the contrast agent. In some embodiments, a dilute suspension of the contrast agent can be injected into an oil or natural gas well such that the contrast agents can migrate to and decorate the oil or natural gas deposit. These deposits can then be illuminated by deep reading electromagnetic tools as disclosed herein.

By way of example and not limitation, the contrast agents provided herein can comprise low-frequency dielectric permittivity contrast agents. In some embodiments, the disclosed contrast agents can comprise any nanopolymorph or any nanomaterial, such as but not limited to, nanotubes, nanosheets, and nanoparticles. In some embodiments, the disclosed contrast agents can be titania nanotubes (TiNT) or TiNT-based contrast agents. Among other things, Na-titania nanotubes can show significant dielectric contrast.

Methods are disclosed herein for identifying subterranean features during geological exploration, mining and recovery.

In some embodiments, the disclosed methods can comprise providing a geological exploration site, such as for example an oil well, natural gas well, or mine shaft; providing a contrast agent; providing an electromagnetic tool; administering a contrast agent into the exploration site; allowing the contrast agent to migrate to a subterranean feature in the exploration site; and illuminating the subterranean feature using the electromagnetic tool.

In some embodiments, the presently disclosed methods and compositions can be employed alongside existing technologies, and in some embodiments enhance the effectiveness of existing technologies currently used in the oil and gas industries. Such existing technologies can include, for example, existing deep electromagnetic tools. The advantages and benefits imparted by the presently disclosed methods and compositions are based on a number of considerations. For example, deep electromagnetic probing tools penetrate deeper and farther away from the well-bore at lower measurement frequencies. Additionally, dielectric permittivity is substantially enhanced at lower frequencies when immobile charges are balanced by mobile counter-ions such as in clay systems. And contrast agents, such as TiNTs with robust clay-like structures having natural affinity to oil-water interfaces, can be injected into a well or other subterranean structure as a suspension thereby allowing the contrast agents to migrate to the oil-water interface and illuminate the oil phase with substantially enhanced dielectric permittivity at lower frequencies.

I. Definitions

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a" and "an" mean "one or more" when used in this application, including the claims.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of mass, weight, time, volume, concentration or percentage is meant to encompass variations of in some embodiments±20%, in some embodiments±10%, in some embodiments±5%, in some embodiments±1%, in some embodiments±0.5%, and in some embodiments±0.1% from the specified amount, as such variations are appropriate to perform the disclosed method.

As used herein, "significance" or "significant" relates to a statistical analysis of the probability that there is a non-random association between two or more entities. To determine whether or not a relationship is "significant" or has "significance", statistical manipulations of the data can be performed to calculate a probability, expressed as a "p value". Those p values that fall below a user-defined cutoff point are regarded as significant. In some embodiments, a p value less than or equal to 0.05, in some embodiments less than 0.01, in some embodiments less than 0.005, and in some embodiments less than 0.001, are regarded as significant. Accordingly, a p value greater than or equal to 0.05 is considered not significant.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D. The term "comprising", which is synonymous with "including", "containing", or "characterized by" is inclusive or open-ended and does not exclude additional, unrecited elements or method steps. "Comprising" is a term of art used in claim language which means that the named elements are present, but other elements can be added and still form a construct or method within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "decorate", when used in conjunction with contrast agents, such as TiNT, refers to the collection of contrast agents around, near, in proximity to, or within a subterranean feature or oil ganglion. In some embodiments a subterranean feature or oil ganglion that is "decorated" by contrast agents can be coated with or otherwise substantially surrounded by a layer of contrast agent. A subterranean feature or oil ganglion "decorated" by contrast agents can be illuminated by deep reading electromagnetic tools based on the enhanced dielectric permittivity imparted by the contrast agents. In some embodiments, to sufficiently "decorate" an oil ganglion such that it is visible by electromagnetic tomography the coating of contrast agent need only be about 2 nanometers thick to about 20 nanometers thick.

II. Contrast Agents

Contrast agents or compositions are disclosed herein that can be used in geological exploration, mining and recovery, or in other applications as would be appreciated by one of ordinary skill in the art. In some embodiments, the contrast agents can be used to locate and define reservoirs of oil and/or natural gas. In some embodiments, the contrast agents can estimate the quantity of oil and/or natural gas capable of being recovered. In some embodiments, the contrast agents can allow for the monitoring of the recovery of oil and/or natural gas, to improve efficiency and/or ensure safety.

The contrast agents, and methods of using the same, can selectively enhance the dielectric effect of ganglions of oil or subterranean features, for example, by decorating or otherwise suitably exposing the oil-water interfaces with the contrast agent. In some embodiments, a dilute suspension of the contrast agent can be injected into an oil or natural gas well such that the contrast agents can migrate to and decorate an oil or natural gas deposit, or other subterranean feature. These deposits or subterranean features can then be illuminated by deep reading electromagnetic tools as discussed further herein.

By way of example and not limitation, the contrast agents provided herein can comprise low-frequency dielectric permittivity contrast agents. In some embodiments, a low-frequency dielectric permittivity can comprise a frequency range of 10 kHz and below, such as for example, 1 kHz, 2 kHz, 3 kHz, 4 kHz, 5 kHz, 6 kHz, 7 kHz, 8 kHz, 9 kHz or 10 kHz. In some embodiments, the disclosed contrast agents can comprise any nanopolymorph or any nanomaterial, such as but not limited to, nanotubes, nanosheets, nanoparticles, and combinations thereof. In some embodiments, the disclosed contrast agents can be TiNT-based contrast agents. Among other things, Na—TiNTs can show significant dielectric contrast and are therefore suitable contrast agents for the presently disclosed subject matter. As would be appreciated by one of ordinary skill in the art, any agent that has a low-frequency dielectric permittivity can in some embodiments be a suitable agent in accordance with the instant disclosure.

Contrast agents disclosed herein, such as TiNT or nanoclays, are stable and require no functionalization by organic molecules. In some embodiments, when the disclosed contrast agents are present in briny suspensions, they can be surrounded by mobile counter-ions native to the brine that form a double layer around the contrast agents. The mobile counter-ions in the double layer can move under the influence of an electromagnetic field giving rise to a large dielectric enhancement. In bare contrast agents, devoid of $Na^+$ ions, or dry contrast agents, this enhancement will be dormant as no counter-ions are available or not mobile, respectively.

Suspensions of contrast agents can be provided in some embodiments. The contrast agents disclosed herein can form a stable suspension in solutions, such as for example water or a briny solution. Fresh water or sea water (salt water) can be acceptable solutions in some embodiments. When suspended in water, for example, the contrast agents can remain stable under very wide pH and salinity ranges that are suitable for naturally occurring formation conditions. The concentration of the contrast agent in a solution can be as low as a few volume percent, such as for example 1%, 2%, 3%, 4%, 5%, 10%, 15%, 20%, 30%, 40%, 50% or more.

The unique structures of TiNTs have properties in common with clays. For example, TiNTs comprise a substantial amount of exchangeable $Na^+$. As disclosed herein, in some embodiments TiNTs can show considerable enhancement of permittivity when saline water penetrates them by forming double layers. As disclosed herein, contrast agents such as TiNTs have natural affinity toward water-oil interfaces and can therefore be used to illuminate oil ganglions by enhancing their dielectric permittivity. When a thin layer of contrast agent coats an oil ganglion or other subterranean feature, the effective property of the ganglion or subterranean feature towards an electromagnetic wave will change. An effective medium calculation shows that when a large contrast of properties is present, a very small volume fraction of contrast agent will suffice to illuminate the reservoir—i.e., ganglions or subterranean features will show up in electromagnetic measurements. The intrinsic dielectric enhancement in these systems has not previously been explored and offers a tremendous opportunity for use in the use in geological exploration, mining and recovery, and particularly in identifying and extracting bypassed oil.

Using the dielectric theory, the complex dielectric constant of materials can be expressed by complex (relative) permitivities:

$$\varepsilon(\omega)=\varepsilon'(\omega)+i\varepsilon''(\omega)=\varepsilon'(\omega)+i\sigma(\omega)/(\varepsilon_0\omega) \quad \text{(Equation 1)}$$

where $\varepsilon'$ is the real permittivity, $\varepsilon''$ is the imaginary permittivity, $\varepsilon_0$ is the permittivity of a vacuum, and $\sigma(\omega)$ is the conductivity.

The dielectric (relative) permittivity of a TiNT suspension, such as for example TiNTs in an electrolyte solution, can be 5,000 or more (in unit of the vacuum permittivity, which is $8.854\times10^{-12}$ F·m$^{-1}$), especially at low frequencies. This is markedly higher than the dielectric permittivity of dry TiNTs, such as TiNTs not in solution, which is about 5 (in unit of the vacuum permittivity, which is $8.854\times10^{-12}$ F·m$^{-1}$). The dielectric permittivity of a TiNT suspension is also markedly higher that the electrolyte suspension alone, which has a dielectric permittivity of about 80 (in unit of the vacuum permittivity, which is $8.854\times10^{-12}$ F·m$^{-1}$). Standard Maxwell-Wagner/Maxwell-Garnett analysis for a two-phase material is unable to explain such results. Instead, without being bound by any particular theory of operation, it is believed that the charged double layers surrounding the particles are responsible for this enhancement in dielectric permittivity observed in a Na—TiNT suspension.

Such a dielectric effect has been observed on induction logs at low frequencies in some peculiar rock formations. Without limitation as to any particular theory, it is believed that the reason for the large dielectric effect lies in the nature of the particular shaly sand, such as clay bearing sands, in the formation. Such formations can have abnormally high c between 10,000 and 30,000 even at low frequencies (induction tool, tens of kHz). Such high dielectric permitivities at low frequencies can originate from the microstructure of the clay, which can give rise to the double layer effect due to counter-ions ($Na^+$ or $Ca^{++}$) that are mobile in the presence of water. Such double layers are illustrated in FIG. 1.

FIG. 1 is a diagram showing clay or titanium dioxide ($TiO_2$) 20 double-layer polarization 24 at the particle level. Positive counter-ions 22 lead to low polarization. Presence of water mobilizes the counter-ions leading to enhanced dielectric contrast. The polarization of exchangeable $Ca^{++}$ and $Na^+$ counter-ions 22 outside the lattice in the presence of water gives rise to interfacial polarization as illustrated in FIG. 1.

Figure 2A:
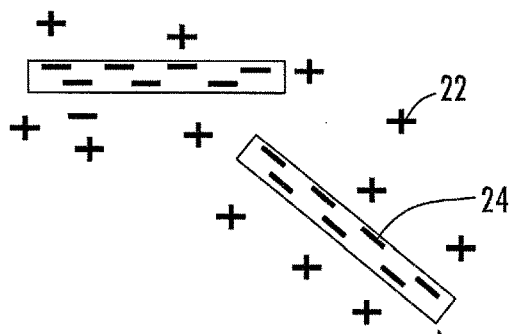
FIGS. 2A and 2B are schematic illustrations illustrating contrast agents and their use to illuminate oil ganglions.

FIG. 2A illustrates electric double layers formed around contrast agents 28, such as TiNT, with bound negative charges 24 balanced by mobile positive counter-ions 22. Negative charges 24 create a double-layer polarization at the particle level.

Figure 2B:
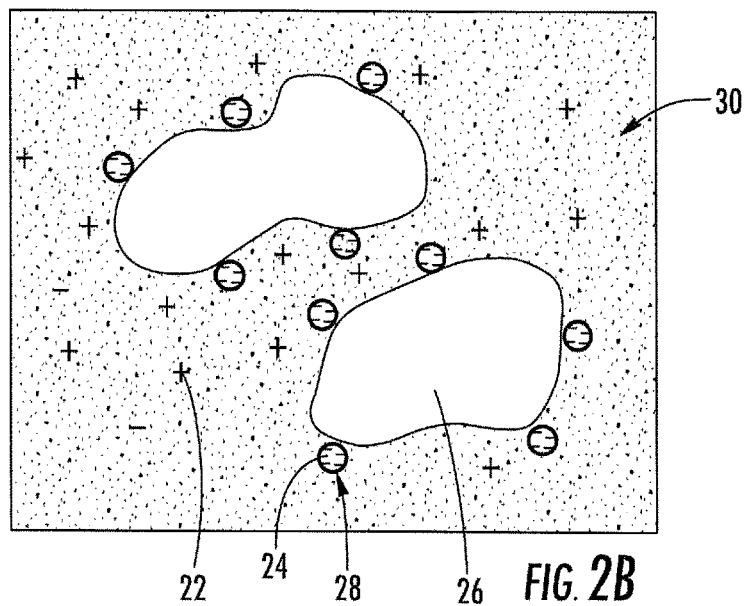

FIG. 2B illustrates oil ganglions 26 decorated with contrast agents 28, such as TiNTs, in contact with formation water 30. Formation water 30 comprises water naturally found in a subterrain reservoir. The counter-ions in formation water 30 polarize in the presence of an electromagnetic wave giving rise to significant dielectric permittivity.

III. Dielectric Permittivity Effect

Titania is a clay-like material with an electrochemical double layer and can possess very large dielectric constants of $\varepsilon(\omega) \approx 10^6$ in the presence of water. In comparison, water alone has a value of 80 and most oils fall below 2. This is the basis for the use of dielectric materials as contrast agents for enhanced contrast in subterranean applications, such as locating bypassed oil and other geologic and mining applications.

The propagation of electromagnetic wave $E(x,t)=E_0 e^{i(kx-\omega t)}$ is determined by $k=\alpha(\omega)+i\beta(\omega)$ where $\alpha(\omega)$ gives a phase shift, whereas $\beta(\omega)$ gives rise to attenuation. Dielectric logging tools measure $\alpha(\omega)$ and $\beta(\omega)$. It can be shown based on the theory of electromagnetism that:

$$k^2 = i\omega\mu(\sigma - i\omega\varepsilon_0\varepsilon') \quad \text{(Equation 2)}$$

where $\sigma$ is the conductivity and $\mu$ is the permeability. Equation 2 shows clearly that the conductivity effect dominates over the dielectric effect at low frequencies because of the $\omega$ dependence. However, this is not the case with the enhanced dielectric constant of contrast agents as disclosed herein, such as for example TiNT in suspension.

Figure 3:
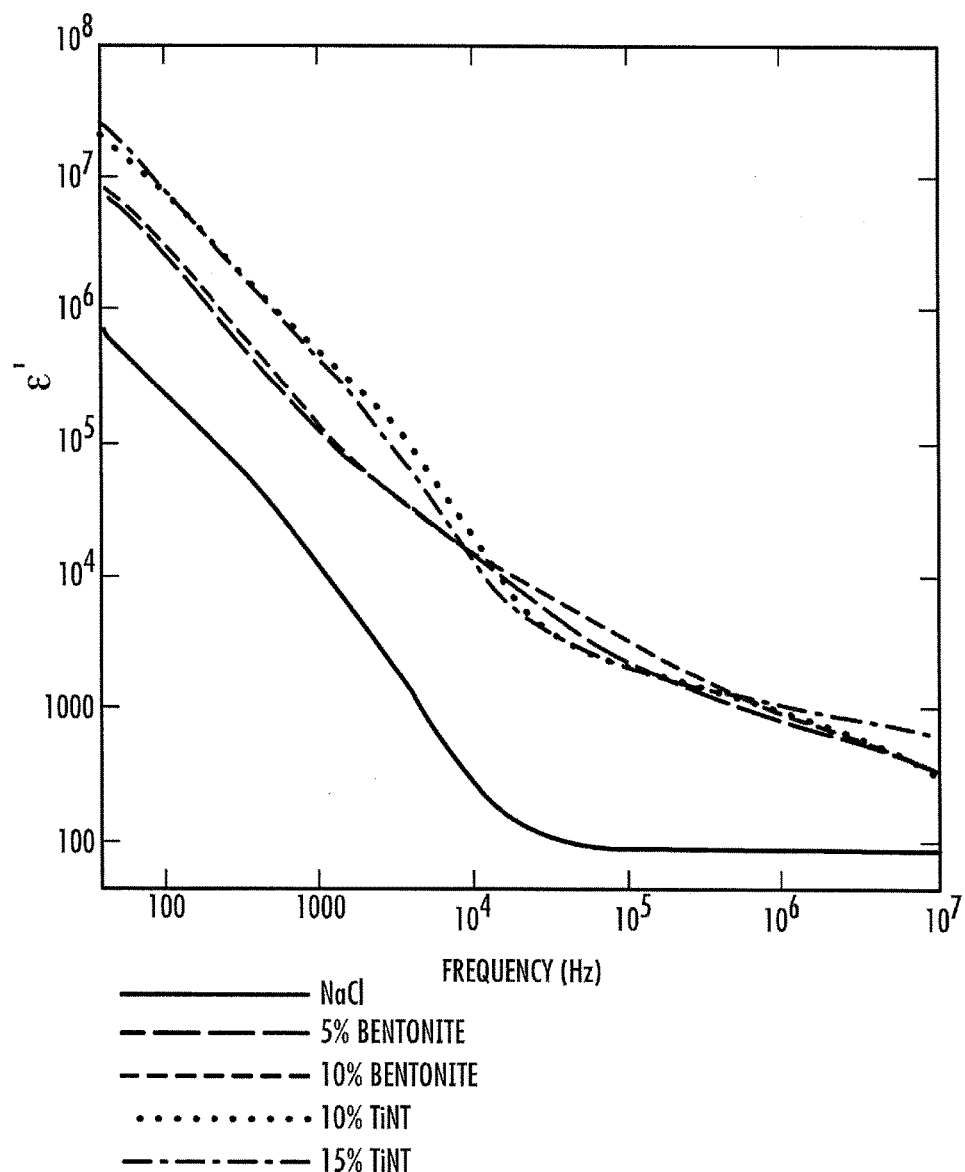
FIG. 3 is a graphical representation comparing the dielectric enhancement of Bentonite clay and titanium nanotube (TiNT) as a function of frequency. Bentonite was tested at 5 wt % (long dashed line) and 10 wt % (short dashed line), while TiNT was tested at 10 wt % (dotted line) and 15 wt % (dashed and dotted line). NaCl (solid line) solution was used as a control.

FIG. 3 is a graphical representation comparing the dielectric enhancement of Bentonite clay and TiNT as a function of frequency. Bentonite is tested at 5 wt % (long dashed line) and 10 wt % (short dashed line), while TiNT was tested at 10 wt % (dotted line) and 15 wt % (dashed and dotted line). NaCl (solid line) solution was used as a control. The dielectric properties of Bentonite clay are established. As expected, Bentonite clay has a significantly higher dielectric enhancement than the control NaCl. As illustrated in FIG. 3, TiNT, which have similar structural characteristics as Bentonite clay, also achieve enhanced dielectric permittivity at lower frequencies as compared to NaCl.

IV. Contrast Agents with Sensing Membranes

Contrast agents as disclosed herein, such as TiNTs, in briny suspensions can be surrounded by mobile counter-ions native to the brine that form a double layer around the contrast agents. The mobile counter-ions in the double layer can move under the influence of an electromagnetic field giving rise to a large dielectric enhancement. However, in bare contrast agents, devoid of $Na^+$ ions, or dry contrast agents, this enhancement will be dormant as no counter-ions are available or not mobile, respectively. When such contrast agents are encapsulated within a membrane they are rendered dielectrically inactive as well since no double layer can form around the contrast agent. In some embodiments, the membrane can be designed to be sensitive to an environmental stimulus or a predetermined condition. Such an encapsulation, referred to herein as a sensing membrane, can for example be time sensitive. That is, the sensing membrane can be sensitive to a predetermined period of time that has elapsed since immersion into a reservoir, for example. A time-sensitive membrane can provide for a passive sensing mechanism for geolocation, e.g., a smart tracer with the ability to be detected by an electromagnetic transmitter and receiver in situ.

In some embodiments, a sensing membrane can be sensitive to one or more specific reservoir conditions, such as temperature, pH, salinity, pressure, or any other predetermined threshold value of any environmental stimuli or condition. When exceeding a given threshold or encountering such a stimulus, the sensing membrane can become permeable or otherwise deteriorate structurally such that briny reservoir fluid is admitted into the membrane and comes into contact with the contrast agent. Upon admission of briny fluid and/or interaction with briny fluid, the contrast agent is provided with the necessary counter-ions to form a double layer. Thereafter, when interrogated with electromagnetic waves, the contrast agent that is now surrounded by counter-ions to form a double layer can exhibit a large dielectric enhancement and thereby act as beacons signaling that the contrast agents encountered the threshold value in geological conditions preprogrammed into the sensing membrane.

Figure 4:
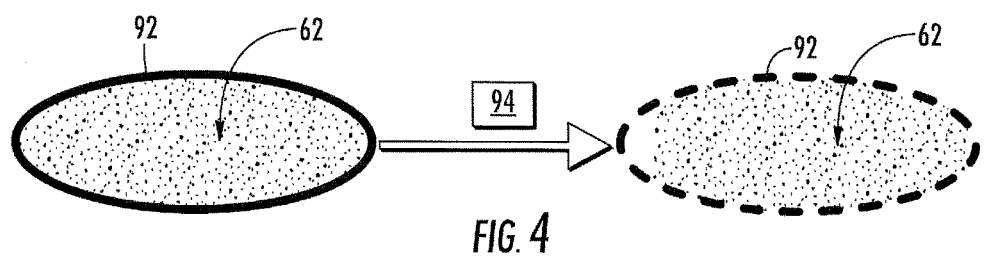
FIG. 4 is a schematic representation illustrating contrast agents encapsulated with a sensing membrane that is activated upon encountering an environmental stimulus.

FIG. 4 is a schematic representation of contrast agents encapsulated with a sensing membrane, also referred to as switchable dielectric induced polarization sensors. In FIG. 4, contrast agent or agents 62 are surrounded by or encapsulated by a membrane 92 that is sensitive to an environmental stimulus or multiple environmental stimuli. Contrast agents 62 encapsulated by membrane 92 are activated upon encountering an environmental stimulus 94 (e.g., temperature, pressure, etc.). Upon encountering environmental stimulus 94, membrane 92 becomes permeable or otherwise deteriorates. Alternatively, or in addition, membrane 92 can be designed to decay at a predetermined time interval or within a set time period. Once membrane 92 becomes permeable, briny reservoir fluid can be admitted through the membrane such that it can come into contact with the contrast agent 62. Thereafter, contrast agent 62 can be detected using probing tools due to its large dielectric enhancement.

V. Synthesis of Titania Nanotube Contrast Agents

Figure 5A:
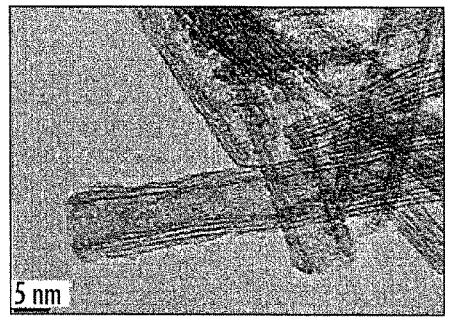
FIGS. 5A and 5B are images of TiNTs.
Figure 5B:
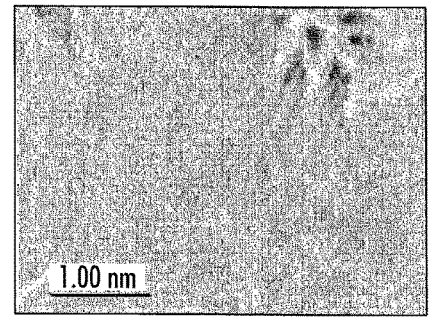

Titania nanotube is a newer form of titania. In some embodiments, the starting material of synthesis can be many different sources of commercially available titania powders, such as, for example, anatase nanocrystals and P25 consisting of anatase and rutile mixture. In some embodiments, such titania powder can be immersed in 10 M NaOH and heated in a Teflon®-lined autoclave at about 130° C. for about 72 hours, although the temperature can range from about 110° C. to about 150° C., and the time can be 12 hours or more. This hydrothermal process converts starting materials into TiNTs. To remove the intercalated $Na^+$ ions, the material produced can be washed with $H_2O$, or with diluted HCl then $H_2O$ to reduce the pH value. In some embodiments, the yield of TiNTs can be over 90% of the total titania material. This process of synthesizing TiNTs can be economical and can be scalable to an industrial level. FIG. 5A is a transmission electron microscopy (TEM) image of as-synthesized TiNT. In FIG. 5A, the multilayered tubular structure are clearly visible. Using TEM imaging, the inner diameters of the TiNT in FIG. 5A are about 5 nm to about 6 nm, the outer diameters about 10 nm to about 12 nm, and interlayer spacings about 0.87 nm. FIG. 5B is a scanning electron microscopy (SEM) image of TiNTs showing the high yield of the synthesis process.

VI. Identifying Subterranean Features Using Contrast Agents

Methods are disclosed herein for identifying subterranean feature(s) during geological exploration, mining and the recovery of natural resources. In some embodiments, the disclosed methods can comprise providing a geological exploration site, such as for example an oil well, natural gas well, or mine shaft. The methods can employ a contrast agent that has significant dielectric contrast. In some embodiments, an electromagnetic tool or tools can be used in the disclosed methods to detect the contrast agent and identify a subterranean feature. In some embodiments, such methods can include the following steps: administering a contrast agent into the exploration site; allowing the contrast agent to migrate to a subterranean feature in the exploration site; and illuminating or visualizing the subterranean feature using an electromagnetic tool.

The contrast agent or agents employed in the disclosed methods for identifying a subterranean feature can comprise any contrast agent or combinations of contrast agents as disclosed herein. By way of example and not limitation, the contrast agent can comprise a nanopolymorph material having a low-frequency dielectric permittivity. Such a nanopolymorph material can comprise a nanotube, a nanosheet and/or a nanoparticle. More particularly, TiNTs, as discussed in further detail herein, can be used as the contrast agent for identifying or illuminating a subterranean feature.

Such contrast agents are effective in methods of identifying subterranean features due to their high dielectric constant, which provides for high dielectric permittivity. Such properties allow for the detection of contrast agents within a subterranean feature thereby allowing for the visualization of the subterranean feature using an appropriate electromagnetic tool. As discussed further herein, the contrast agents can have a dielectric permittivity that is greater than about 5,000 to about 10 million in unit of vacuum permittivity.

As discussed herein, the contrast agents can further comprise a membrane or coating encapsulating the contrast agent, wherein the membrane can become permeable or deteriorate upon encountering an environmental stimulus. The environmental stimulus to which the membrane or coating is sensitive can be purposefully selected and predetermined based on the desired application. For example, a membrane can sense and become permeable in response to a desired pH, temperature, pressure, salinity, time period, or combinations thereof.

In some embodiments, a contrast agent can be administered to an exploration site where it is desirable to identify and characterize a subterranean feature by mixing the contrast agent in a solution and depositing the solution in the exploration site. That is, a solution containing the contrast agent can be deposited or pumped into a bore hole, well, or mine shaft. The contrast agent solution can then permeate the subterranean geological features surrounding the exploration site. Once a sufficient time has passed for the contrast agent solution to migrate to the subterranean feature or area to be explored, an electromagnetic tool can be used to visualize the subterrain. In some embodiments, a sufficient time for the contrast agent solution to migrate to the subterranean feature or area to be explored can range from a few days to several months. More particularly, a sufficient migration time can be about 1 day, 2 days, 3 days, 4 days, 5 days, 6 days, 7 days, 8 days, 9 days, 10 days or more, or about 1 month, 2 months, 3 months, 4 months, 5 months or more.

In some embodiments, the solution can comprise an electrolyte solution. In some embodiments, an electrolyte solution can comprise NaCl. The contrast agents disclosed herein can form a stable suspension in solutions, such as for example water or a briny solution. Fresh water or sea water (salt water) can be acceptable solutions in some embodiments. When suspended in water, for example, the contrast agents can remain stable under very wide pH and salinity ranges that are suitable for naturally occurring formation conditions. The concentration of the contrast agent in a solution can be as low as a few volume percent, such as for example 1%, 2%, 3%, 4%, 5%, 10%, 15%, 20%, 30%, 40%, 50% or more.

Once a contrast agent is administered to an exploration site, and in some embodiments after the contrast agent and/or the solution containing the contrast agent has migrated to a subterranean feature in the exploration site, an electromagnetic tool can be used to detect the contrast agents within a subterranean feature. Because of the dielectric contrast of the contrast agents the electromagnetic tool will allow for the visualization of any subterranean feature penetrated and/or surrounded by the contrast agent solution.

The electromagnetic tools used in the disclosed methods of visualizing subterranean features can in some embodiments include existing technologies currently used in the oil and gas industries. Such existing technology can include, for example, existing deep electromagnetic tools. For instance, cross-well electromagnetic tomography can be used in conjunction with the disclosed contrast agents to visualize subterranean features. Cross-well electromagnetic tomography, when operated at low frequencies, has a penetration range of up to about 1 kilometer (3,280 feet) compared to logging while drilling (LWD) systems, which can only probe up to about 20 feet.

Figure 6:
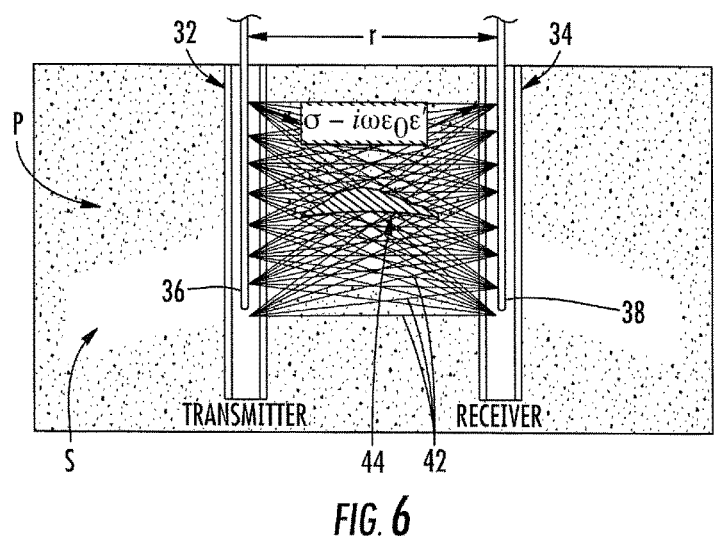
FIG. 6 is an illustration of cross-well electromagnetic tomography measurements between two wells.

FIG. 6 is an illustration of cross-well electromagnetic tomography used in two separate wells. For example, cross-well electromagnetic tomography can be used to take measurements between two wells (first well 32 and second well 34) separated by a given distance r up to 1,000 meters. Cross-well electromagnetic tomography can operate at the frequency range of about 10 Hz to about 100 Hz for cased wells and up to about 1 kHz for open wells. A first well 32 can comprise a transmitter 36 and receiver 38 for transmitting and receiving an electromagnetic signal 42, respectively. Sensitivity to a subterranean formation, such as bypassed oil ganglions, increases with conductivity and dielectric constant. As such, the use of a contrast agent in conjunction with cross-well electromagnetic tomography as discussed herein can enhance sensitivity to formation detection.

VII. Illuminating Bypassed Oil Using Titania Nanotubes

Traditional methods of oil recovery can be inefficient. For example, after the primary recovery of oil from a reservoir, about 30-70% residual oil in place (ROIP) remains in the reservoir in the form of ganglions, which are oil blobs that are generally a few pore-lengths long (in the direction of the flow) and about a pore wide. In some embodiments, the disclosed compositions and methods can be used to locate and estimate ROIP in reservoirs, which can then be recovered to increase the efficiency of oil recovery.

In some embodiments, methods are provided for using the disclosed contrast agents to make ganglions of bypassed oil visible towards deep penetrating electromagnetic probing tools. For example, in some embodiments such a method can comprise providing a contrast agent, providing an electromagnetic tool, administering a contrast agent into an oil well, allowing the contrast agent to migrate to a ganglion of bypassed oil in the oil well, and illuminating the ganglion of bypassed oil using the electromagnetic tool. Such methods can in some embodiments employ contrast agents that can have a significant dielectric contrast. In some embodiments, TiNT, such as Na-titania oxide nanotubes, as well as nanoclays, can show significant dielectric contrast and can therefore serve as contrast agents. The disclosed methods can selectively enhance the dielectric effects of ganglions by decorating the oil-water interfaces with contrast agents, which are stable and, in embodiments, require no functionalization by organic molecules. In some embodiments, a dilute suspension of the contrast agent can be injected into a well near a ganglion of bypassed oil so that the contrast agent can migrate through the subterrain where the oil ganglia is located. These ganglia can then be illuminated by deep reading electromagnetic tools due to the dielectric activity of the contrast agents surrounding the oil ganglia.

In some embodiments, the disclosed compositions and methods can provide for illuminating bypassed oil using TiNT. The unique structures of TiNT share some structural qualities with clays. Titania nanotubes comprise a substantial amount of exchangeable $Na^+$. As disclosed herein, in some embodiments, TiNT can show considerable enhancement of permittivity when saline water penetrates them by forming double layers. As disclosed herein, TiNT have a natural affinity toward water-oil interfaces and can therefore be used to illuminate oil ganglions by enhancing their dielectric permittivity as illustrated in FIG. 2B.

When a thin layer of contrast agent coats an oil ganglion, the effective property of ganglion towards an electromagnetic wave will change. An effective medium calculation shows that when a large contrast of properties is present, a very small volume fraction of contrast agent will suffice to illuminate the reservoir. That is, oil ganglions will show up in electromagnetic measurements when surrounded by contrast agents. For example, for an oil ganglion of about 100 micron, which is about the normal size of the capillary number encountered in the usual recovery of hydrocarbons from a subterranean structure, a coating by a contrast agent such TiNT of a thickness of about 6 nanometers will suffice if the dielectric permittivity contrast of the contrast agent differs by about a factor of 1,000 or more from that of oil, water, or rock. For tighter pores and thinner ganglions, even less contrast will suffice. Thus, to sufficiently decorate an oil ganglion such that it is visible by electromagnetic tomography the coating of contrast agent need only be about 2 nanometers thick to about 20 nanometers thick.

The disclosed methods can selectively enhance the dielectric effects of oil ganglions by decorating the oil-water interfaces with contrast agents, such as TiNT or nano-clays, which are stable and require no functionalization by organic molecules. In some embodiments, a dilute suspension of the contrast agent, such as TiNT (with suitable counter-ions), can be injected near a bypassed oil pool. The contrast agent, such as TiNT, can migrate to decorate the oil ganglia. These ganglia can then be illuminated by deep reading electromagnetic tools.

The dielectric enhancement of existing electromagnetic tomography systems using the disclosed contrast agents has not previously been explored and offers a tremendous opportunity for use in the use in geological exploration, mining and recovery, and particularly in identifying and extracting bypassed oil.

As discussed herein, the electromagnetic tools used in the disclosed methods of visualizing oil ganglia can in some embodiments include existing technologies currently used in the oil and gas industries. Such existing technology can include, for example, existing deep electromagnetic tools. For instance, cross-well electromagnetic tomography can be used in conjunction with the disclosed contrast agents to visualize subterranean features. Cross-well electromagnetic tomography, when operated at low frequencies, has a penetration range of up to about 1 kilometer (3,280 feet) compared to logging while drilling (LWD) systems which can only probe up to about 20 feet.

FIG. 6 is an illustration of an example of cross-well electromagnetic tomography used in two separate wells. For example, cross-well electromagnetic tomography can be used to take measurements between two wells (first well 32 and second well 34) separated by a given distance r up to 1,000 meters. Cross-well electromagnetic tomography can operate at the frequency range of about 10 Hz to about 100 Hz for cased wells and up to about 1 kHz for open wells. A first well 32 can comprise a transmitter 36 and receiver 38 for transmitting and receiving an electromagnetic signal 42, respectively. Sensitivity to a subterranean formation, such as bypassed oil ganglions, increases with conductivity and dielectric constant. As such, the use of a contrast agent in conjunction with cross-well electromagnetic tomography as discussed herein can enhance sensitivity of the cross-well electromagnetic tomography equipment for detection of features in the subterranean formation 44.

Figure 7:
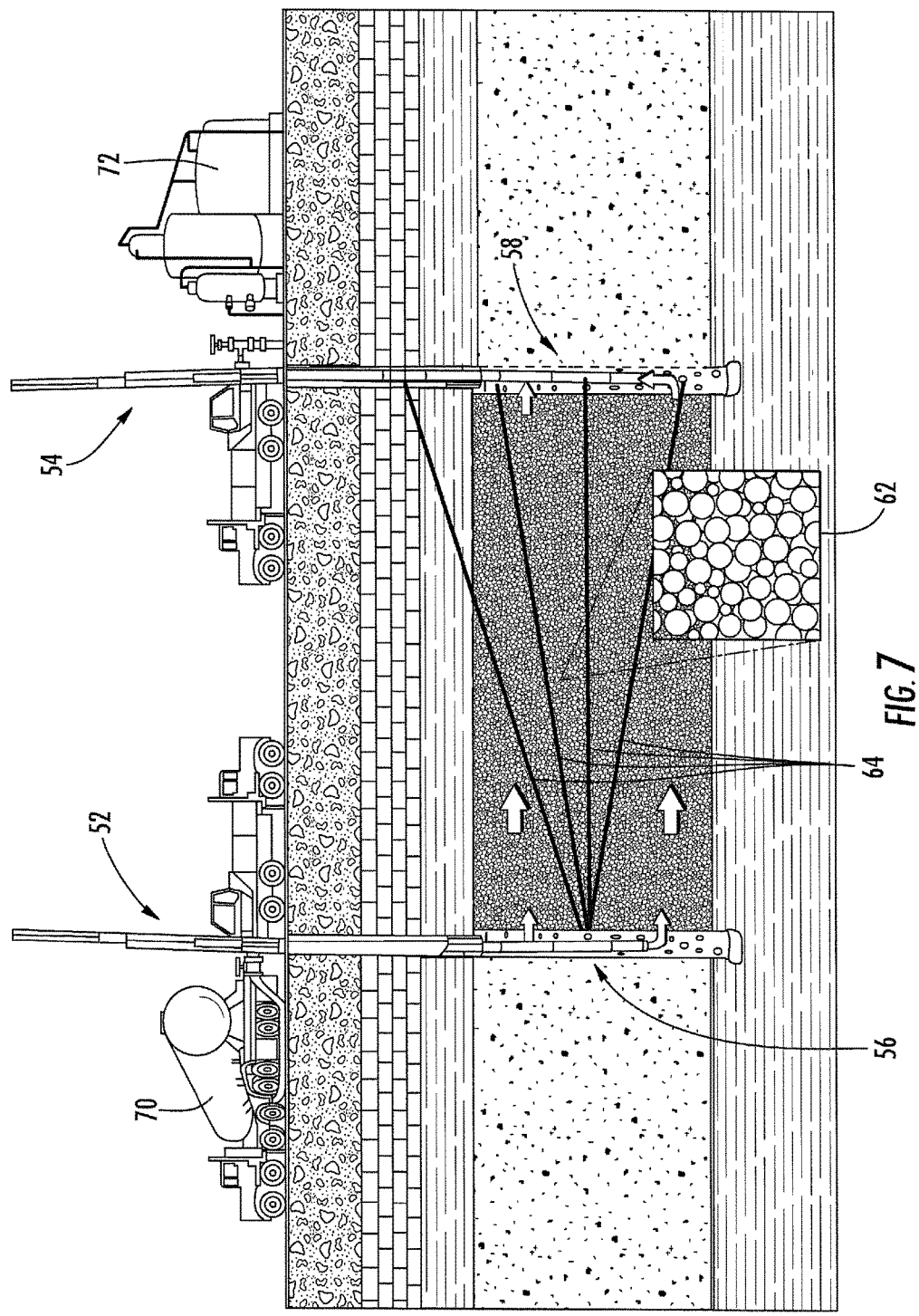
FIG. 7 is a schematic illustration of enhanced water flood imaging via co-injection of contrast agents.

FIG. 7 is a schematic illustration of an example of enhanced water flood imaging via co-injection of contrast agents, such as those disclosed herein. Similar to the cross-well electromagnetic tomography illustrated in FIG. 6, electromagnetic tomography measurements can be taken between two wells (first well 52 and second well 54). As illustrated in FIG. 6, first well 52 can act as an injection well, and second well 54 can act as a production well. Container 70 can supply the contrast agent 62, and production equipment 72 can recover the contrast agent 62 as well as gas or oil produced by second well 54. Contrast agent 62 can be injected as part of a solution into first well 52 and allowed to flow through the subterrain and interact with any subterranean feature. The first well 52 can comprise a transmitter 56 for transmitting an electromagnetic signal 64, while the second well 54 can comprise a receiver 58 for receiving an electromagnetic signal 64. Any subterranean feature decorated or surrounded by the contrast agent 62 can be detected based on the enhanced dielectric permittivity imparted by the contrast agent 62. Sensitivity to a subterranean formation increases with conductivity and dielectric constant. Therefore, the use of a contrast agent 62 in conjunction with cross-well electromagnetic tomography as discussed herein can enhance sensitivity of the cross-well electromagnetic tomography equipment to formation detection of features in the subterranean formation.

VIII. Use of Contrast Agents in Hydraulic Fracturing

In some embodiments, methods are provided herein for using the disclosed contrast agents in natural gas extraction and exploration. In some embodiments, the disclosed contrast agents and methods of using the same can be employed in natural gas extraction techniques, such as induced hydraulic fracturing, also known as fracking or hydrofracking. Presently available techniques employed in hydraulic fracturing are not adequate to determine the size and orientation of fractures in the subterrain. Determining the size and orientation of a fracture is beneficial to determining the drainage of a reservoir, and for the safe and effective extraction of natural gas.

Figure 8:
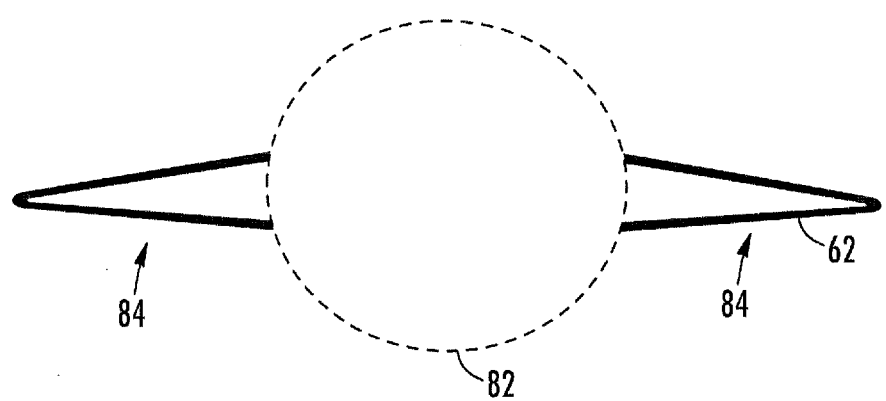
FIG. 8 is a schematic illustration of the use of contrast agents to illuminate fractures in hydraulic fracturing applications.

Using the disclosed contrast agents along with electromagnetic probing tools can allow for the visualization and delineation of the size, orientation, and other parameters needed for safe and/or effective hydraulic fracturing, such as for example illuminating the fracture and tracking the flow of hydraulic fluids. In some embodiments, a fracture can be filled with a suspension containing the presently disclosed contrast agents and then visualized using probing tools. FIG. 8 is a schematic illustration of the use of contrast agents to illuminate fractures in hydraulic fracturing applications. FIG. 8 is a top-down cross-sectional view of a bore hole 82 and fracture 84 in the subterrain. Bore hole 82 can be used to provide access to fracture 84 in the subterrain so that a suspension of contrast agent 62 can be pumped into fracture 84. The suspension of contrast agent 62 can infiltrate fracture 84 such that contrast agent 62 outlines the contours of fracture 84. As with the oil well applications discussed herein, electromagnetic probing tools and electromagnetic tomography methodologies can then be used to visualize the contours and properties of fracture 84.

What is claimed is:

1. A method of identifying a subterranean feature, comprising:
administering a contrast agent into a geological site, wherein the contrast agent comprises a nanopolymorph material having a low-frequency dielectric permittivity, wherein the nanopolymorph material is a titania nanotube;
allowing the contrast agent to migrate to a subterranean feature in the geological site; and
illuminating the subterranean feature using an electromagnetic tool configured to sense a presence of the contrast agent based on the enhanced dielectric permittivity imparted by the contrast agent that has migrated to the subterranean feature.

2. The method of claim 1, wherein a dielectric permittivity of the contrast agent is greater than about 5,000 (F/m).

3. The method of claim 1, further comprising a membrane encapsulating the contrast agent.

4. The method of claim 3, wherein the membrane is configured to become permeable upon encountering a stimulus selected from the group consisting of pH, temperature, pressure, salinity, and combinations thereof.

5. The method of claim 3, wherein the membrane is configured to become permeable after a predetermined period of time has elapsed.

6. The method of claim 1, wherein the contrast agent is stable at a temperature up to about 350° C. and a pH ranging from about 1 to about 12.

7. The method of claim 1, wherein the sensing a presence of the contrast agent is performed as a function of a dielectric enhancement of the subterranean feature by the nanopolymorph material having the low-frequency dielectric permittivity.

8. A method of identifying a ganglion of bypassed oil in a geological formation, comprising:
administering a contrast agent into the geological formation, wherein the contrast agent comprises a nanopolymorph material having a low-frequency dielectric permittivity, wherein the nanopolymorph material is a titania nanotube, wherein the contrast agent migrates to the ganglion of bypassed oil in the geological formation; and
illuminating the ganglion of bypassed oil using an electromagnetic tool configured to sense a presence of the contrast agent based on the enhanced dielectric permittivity imparted by the contrast agent that has migrated to the ganglion of bypassed oil.

9. The method of claim 8, wherein a dielectric permittivity of the contrast agent is greater than about 5,000 (F/m).

10. The method of claim 8, further comprising a membrane encapsulating the contrast agent, wherein the membrane is configured to become permeable upon encountering a stimulus selected from the group consisting of pH, temperature, pressure, salinity, and combinations thereof.

11. The method of claim 8, wherein the contrast agent is stable at a temperature up to about 350° C. and a pH ranging from about 1 to about 12.

12. The method of claim 8, wherein the contrast agent is configured to have an affinity toward an interface between water and oil.

13. The method of claim 8, wherein the sensing a presence of the contrast agent is performed as a function of a dielectric enhancement of the ganglion of bypassed oil by the nanopolymorph material having the low-frequency dielectric permittivity.

14. A method of illuminating a subterranean fracture, comprising:
administering a contrast agent into the subterranean fracture, wherein the contrast agent comprises a titania nanotube having a low frequency dielectric permittivity greater than about 5,000 (F/m); and
illuminating the subterranean fracture using an electromagnetic tool configured to sense a presence of the contrast agent based on the enhanced dielectric permittivity imparted by the contrast agent.

15. The method of claim 14, further comprising a membrane encapsulating the contrast agent, wherein the membrane is configured to become permeable upon encountering a stimulus selected from the group consisting of pH, temperature, pressure, salinity, and combinations thereof.

16. The method of claim 14, wherein the contrast agent is stable at a temperature up to about 350° C. and a pH ranging from about 1 to about 12.

17. The method of claim 14, wherein the titania nanotube has the low frequency permittivity greater than about 5,000 (F/m) when in the presence of brine within the subterranean fracture.

18. A method of identifying a subterranean feature, comprising:
administering a contrast agent into a geological site, wherein the contrast agent comprises a nanopolymorph material having a low-frequency dielectric permittivity, wherein the nanopolymorph material is a titania nanotube;
allowing the contrast agent to migrate to a subterranean feature in the geological site; and
illuminating the subterranean feature using an electromagnetic tool configured to sense a presence of the contrast agent based on the enhanced dielectric permittivity imparted by the contrast agent that has migrated to the subterranean feature, wherein the titania nanotube comprises an exchangeable $Na^+$.

19. A method of identifying a ganglion of bypassed oil in a geological formation, comprising:
administering a contrast agent into the geological formation, wherein the contrast agent comprises a nanopolymorph material having a low-frequency dielectric permittivity, wherein the nanopolymorph material is a titania nanotube, wherein the contrast agent migrates to the ganglion of bypassed oil in the geological formation; and
illuminating the ganglion of bypassed oil using an electromagnetic tool configured to sense a presence of the contrast agent based on the enhanced dielectric permittivity imparted by the contrast agent that has migrated to the ganglion of bypassed oil, wherein the titania nanotube comprises an exchangeable $Na^+$.

20. A method of illuminating a subterranean fracture, comprising:
administering a contrast agent into the subterranean fracture, wherein the contrast agent comprises a titania nanotube having a low-frequency dielectric permittivity greater than about 5,000 (F/m); and illuminating the subterranean fracture using an electromagnetic tool configured to sense a presence of the contrast agent based on the enhanced dielectric permittivity imparted by the contrast agent, wherein the titania nanotube comprises an exchangeable $Na^+$.

* * * * *